United States Patent
Raghoebardajal et al.

(10) Patent No.: US 9,904,056 B2
(45) Date of Patent: Feb. 27, 2018

(54) DISPLAY

(71) Applicant: Sony Interactive Entertainment Europe Limited, London (GB)

(72) Inventors: Sharwin Winesh Raghoebardajal, London (GB); Ian Henry Bickerstaff, London (GB); Bruno Ribeiro, London (GB)

(73) Assignee: Sony Interactive Entertainment Europe Limited (GB)

( * ) Notice: Subject to any disclaimer, the term of this patent is extended or adjusted under 35 U.S.C. 154(b) by 0 days.

(21) Appl. No.: 15/007,531

(22) Filed: Jan. 27, 2016

(65) Prior Publication Data

US 2016/0216518 A1    Jul. 28, 2016

(30) Foreign Application Priority Data

Jan. 28, 2015    (GB) .................. 1501409.5

(51) Int. Cl.
*G02B 27/01*    (2006.01)
*G06F 3/01*    (2006.01)
(Continued)

(52) U.S. Cl.
CPC ....... *G02B 27/0172* (2013.01); *G02B 27/017* (2013.01); *G06F 3/011* (2013.01);
(Continued)

(58) Field of Classification Search
CPC ... G02B 27/017; G06F 3/012; G06F 3/04815; G09G 3/003; G09G 3/007; H04N 13/011; H04N 13/0014
See application file for complete search history.

(56) References Cited

U.S. PATENT DOCUMENTS 5,841,439 A * 11/1998 Pose .................. G06T 15/005
345/418
5,867,166 A    2/1999 Myhrvold et al.
(Continued)

FOREIGN PATENT DOCUMENTS

EP    1731943 A1    12/2006
WO    9620470 A1    7/1996

OTHER PUBLICATIONS

Search Report for Application No. GB1501409.5 dated Jul. 1, 2015.
(Continued)

*Primary Examiner* — Ariel Balaoing
(74) *Attorney, Agent, or Firm* — Lerner, David, Littenberg, Krumholz & Mentlik, LLP

(57) ABSTRACT

A display method using a display operable to display an image to a viewer is provided. The method includes detecting an initial position and/or orientation of an image view. Foreground portions of an image are rendered according to the detected initial position and/or orientation. Background portions of the image are rendered according to the detected initial position and/or orientation, at an image rendering rate. The following are performed at an image display rate higher than the image rendering rate: (i) detecting a current position and/or orientation of the image view; (ii) re-projecting the background portions of a most recent image according to any differences between the initial position and/or orientation and the current position and/or orientation of the image view; and (iii) combining the foreground portions and the re-projected background portions to generate an image for display.

12 Claims, 17 Drawing Sheets

(51) Int. Cl.
G06F 3/048 (2013.01)
G09G 3/00 (2006.01)
G06F 3/0481 (2013.01)
H04N 13/00 (2018.01)

(52) U.S. Cl.
CPC .......... *G06F 3/012* (2013.01); *G06F 3/04815* (2013.01); *G09G 3/003* (2013.01); *G09G 3/007* (2013.01); *H04N 13/0011* (2013.01); *H04N 13/0014* (2013.01); *G02B 2027/014* (2013.01); *G02B 2027/0127* (2013.01); *G02B 2027/0145* (2013.01); *G02B 2027/0178* (2013.01); *G02B 2027/0187* (2013.01); *G09G 2320/0261* (2013.01); *G09G 2340/0435* (2013.01)

(56) References Cited

U.S. PATENT DOCUMENTS

| | | |
|---|---|---|
| 6,016,150 A | 1/2000 | Lengyel et al. |
| 8,184,068 B1 | 5/2012 | Rhodes et al. |
| 2006/0028400 A1 | 2/2006 | Lapstun et al. |
| 2010/0157433 A1 | 6/2010 | Mukawa et al. |

OTHER PUBLICATIONS

Seitz, Steven M., Image-Based Transformation of Viewpoint and Scene Appearance, PhD Dissertation, Computer Sciences Department, Technical Report 1354, University of Wisconsin, Madison, Oct. 1997.

* cited by examiner

DISPLAY

CROSS REFERENCE TO RELATED APPLICATIONS

The present application claims the benefit of and priority to GB Patent Application No. 1501409.5, filed Jan. 28, 2015, the entire disclosure of which is hereby incorporated by reference herein.

BACKGROUND

Field

This disclosure relates to displays.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

As background, an example head-mountable display (HMD) will be discussed, although (as described further below) the disclosure is applicable to other types of displays.

An HMD is an image or video display device which may be worn on the head or as part of a helmet. Either one eye or both eyes are provided with small electronic display devices.

Some HMDs allow a displayed image to be superimposed on a real-world view. This type of HMD can be referred to as an optical see-through HMD and generally requires the display devices to be positioned somewhere other than directly in front of the user's eyes. Some way of deflecting the displayed image so that the user may see it is then required. This might be through the use of a partially reflective mirror placed in front of the user's eyes so as to allow the user to see through the mirror but also to see a reflection of the output of the display devices. In another arrangement, disclosed in EP-A-1 731 943 and US-A-2010/0157433, the contents of which are incorporated herein by reference, a waveguide arrangement employing total internal reflection is used to convey a displayed image from a display device disposed to the side of the user's head so that the user may see the displayed image but still see a view of the real world through the waveguide. Once again, in either of these types of arrangement, a virtual image of the display is created (using known techniques) so that the user sees the virtual image at an appropriate size and distance to allow relaxed viewing. For example, even though the physical display device may be tiny (for example, 10 mm×10 mm) and may be just a few millimeters from the user's eye, the virtual image may be arranged so as to be perceived by the user at a distance of (for example) 20 m from the user, having a perceived size of 5 m×5 m.

Other HMDs, however, allow the user only to see the displayed images, which is to say that they obscure the real world environment surrounding the user. This type of HMD can position the actual display devices in front of the user's eyes, in association with appropriate lenses which place a virtual displayed image at a suitable distance for the user to focus in a relaxed manner—for example, at a similar virtual distance and perceived size as the optical see-through HMD described above. This type of device might be used for viewing movies or similar recorded content, or for viewing so-called virtual reality content representing a virtual space surrounding the user. It is of course however possible to display a real-world view on this type of HMD, for example by using a forward-facing camera to generate images for display on the display devices.

Although the original development of HMDs was perhaps driven by the military and professional applications of these devices, HMDs are becoming more popular for use by casual users in, for example, computer game or domestic computing applications.

SUMMARY

The present disclosure addresses or mitigates problems arising from these arrangements.

Respective aspects and features of the present disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Embodiments of the present disclosure can provide a display method and apparatus using a display operable to display an image to a viewer. In some embodiments, the display is a head-mountable display and the position and/or orientation of the viewer's head is detected by detecting a position and/or orientation of the head-mountable display. The head mountable display may have a frame to be mounted onto an viewer's head, the frame defining one or two eye display positions which, in use, are positioned in front of a respective eye of the viewer and a respective display element is mounted with respect to each of the eye display positions, the display element providing a virtual image of a video display of a video signal from a video signal source to that eye of the viewer. In other examples, the display is not a head-mountable display. In some embodiments, the display (whether head mountable or not) may be referred to as an immersive display, in that in normal use it fills at least a threshold angular range (for example, at least 40°) of the field of view of the user. Examples include multiple projector displays, wrap-around (curved) displays and the like.

Figure 1:
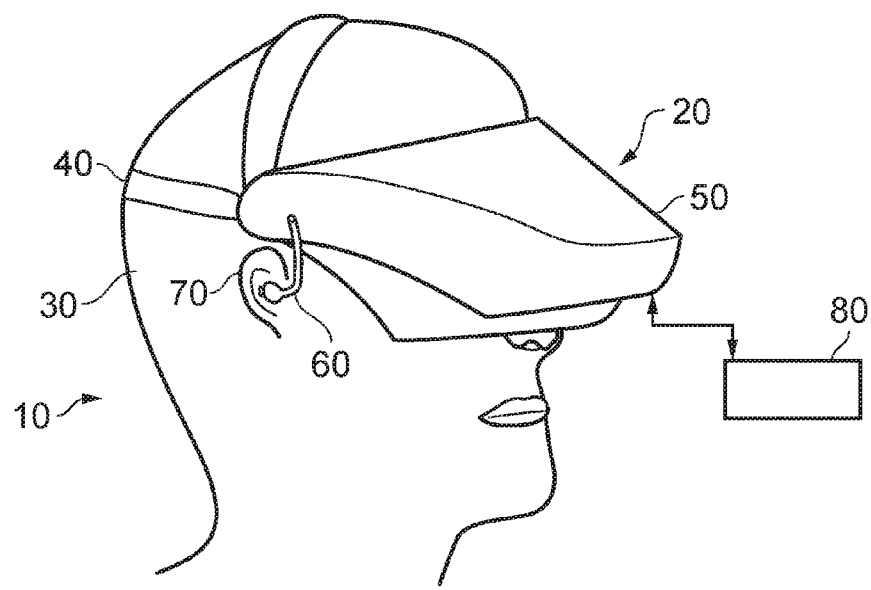
FIG. 1 schematically illustrates an HMD worn by a user.

Referring now to FIG. 1, a user 10 is wearing an HMD 20 on the user's head 30. The HMD comprises a frame 40, in this example formed of a rear strap and a top strap, and a display portion 50.

The HMD of FIG. 1 completely obscures the user's view of the surrounding environment. All that the user can see is the pair of images displayed within the HMD.

The HMD has associated headphone earpieces 60 which fit into the user's left and right ears 70. The earpieces 60 replay an audio signal provided from an external source, which may be the same as the video signal source which provides the video signal for display to the user's eyes.

In operation, a video signal is provided for display by the HMD. This could be provided by an external video signal source 80 such as a video games machine or data processing apparatus (such as a personal computer), in which case the signals could be transmitted to the HMD by a wired or a wireless connection. Examples of suitable wireless connections include Bluetooth® connections. Audio signals for the earpieces 60 can be carried by the same connection. Similarly, any control signals passed from the HMD to the video (audio) signal source may be carried by the same connection.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other examples, the user's view of the external environment may not in fact be entirely obscured; the displayed images could be arranged so as to be superposed (from the user's point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
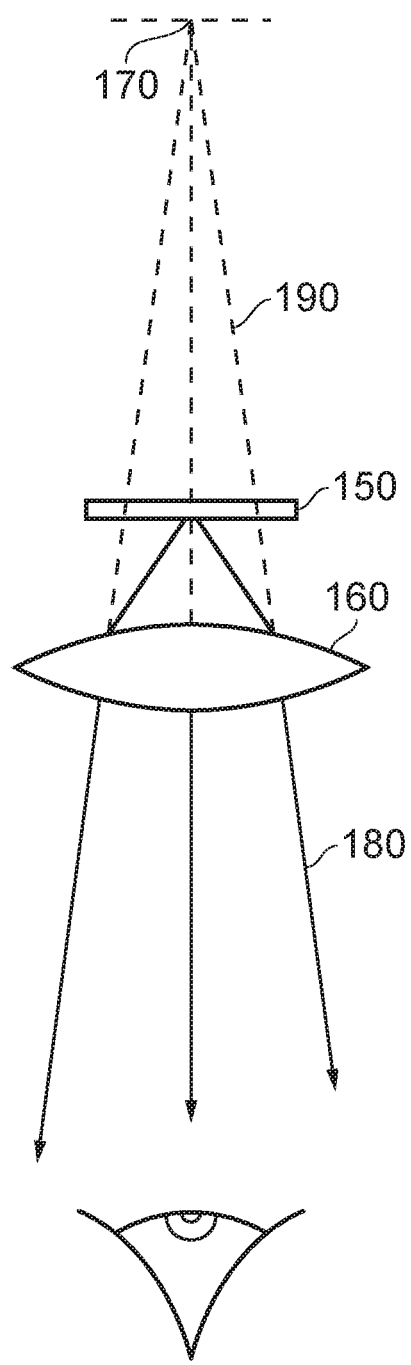
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several meters. In FIG. 3, solid lines (such as the line 180) are used to denote real optical rays, whereas broken lines (such as the line 190) are used to denote virtual rays.

Figure 4:
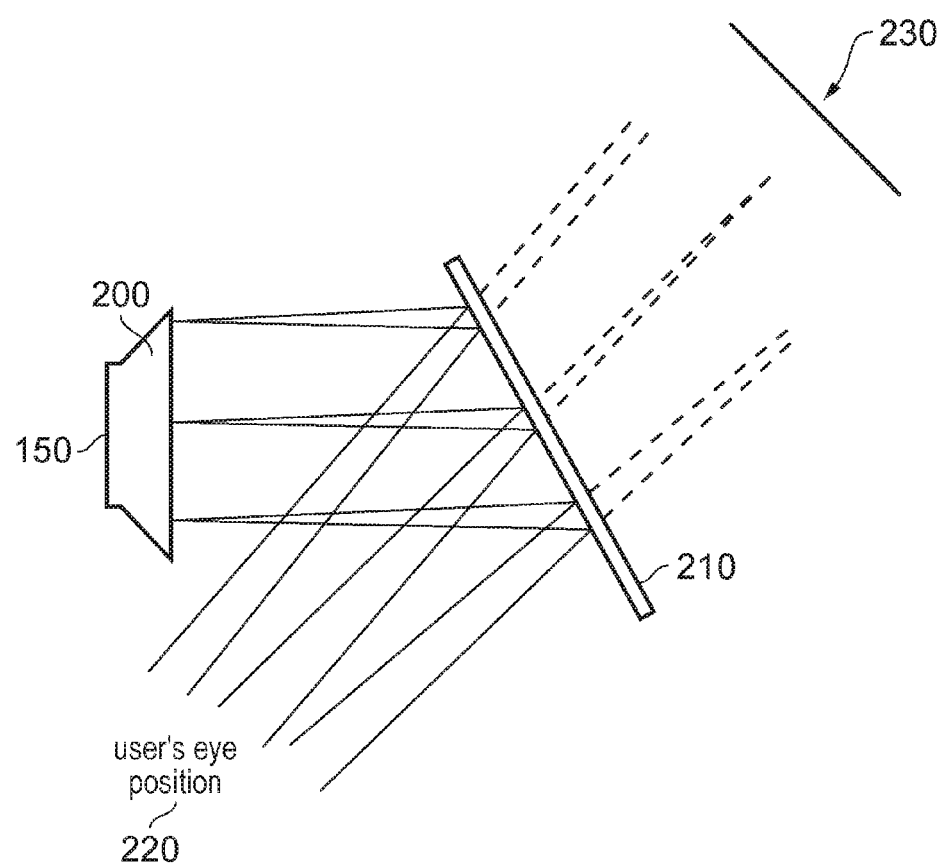
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 (and those in FIG. 15 to be described below) could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint need to track movements with respect to a real or virtual space in which the user is located.

This tracking is carried out by detecting motion of the HMD and varying the apparent viewpoint of the displayed images so that the apparent viewpoint tracks the motion.

Figure 6:
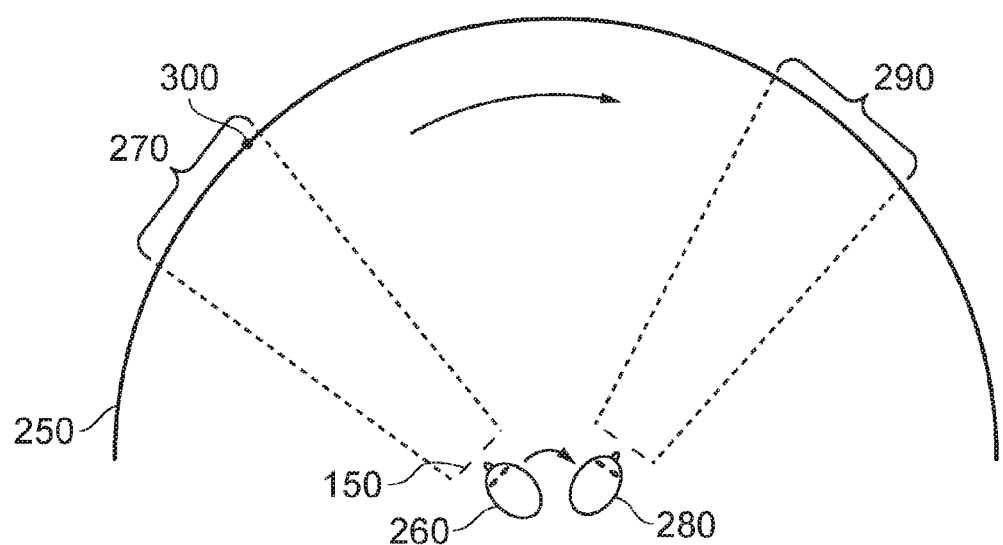
FIG. 6 schematically illustrates a change of view of user of an HMD.

FIG. 6 schematically illustrates the effect of a user head movement in a VR or AR system.

Referring to FIG. 6, a virtual environment is represented by a (virtual) spherical shell 250 around a user. Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display elements 150 of the user's HMD.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 is displayed by the HMD.

So, in this arrangement, the apparent viewpoint within the virtual environment moves with the head movement. If the head rotates to the right side, for example, as shown in FIG. 6, the apparent viewpoint also moves to the right from the user's point of view. If the situation is considered from the aspect of a displayed object, such as a displayed object 300, this will effectively move in the opposite direction to the head movement. So, if the head movement is to the right, the apparent viewpoint moves to the right but an object such as the displayed object 300 which is stationary in the virtual environment will move towards the left of the displayed image and eventually will disappear off the left-hand side of the displayed image, for the simple reason that the displayed portion of the virtual environment has moved to the right whereas the displayed object 300 has not moved in the virtual environment. Similar considerations apply to the up-down component of any motion.

Figure 2:
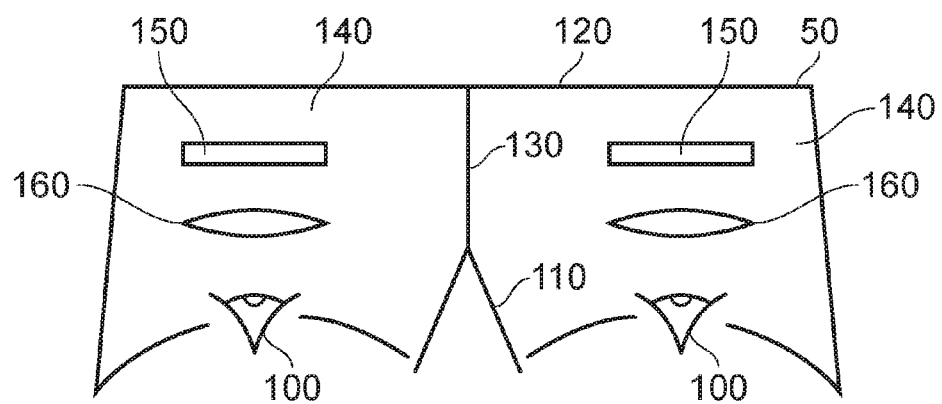
FIG. 2 is a schematic plan view of an HMD.
Figure 7A:
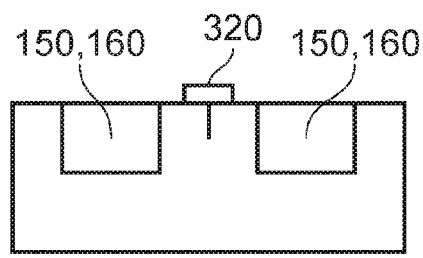
FIGS. 7a and 7b schematically illustrate HMDs with motion sensing.
Figure 7B:
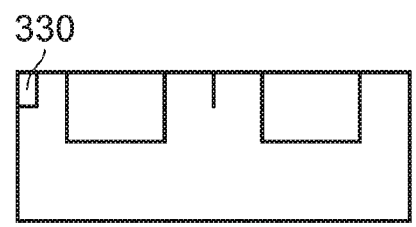

FIGS. 7a and 7b schematically illustrated HMDs with motion sensing. The two drawings are in a similar format to that shown in FIG. 2. That is to say, the drawings are schematic plan views of an HMD, in which the display element 150 and optical elements 160 are represented by a simple box shape. Many features of FIG. 2 are not shown, for clarity of the diagrams. Both drawings show examples of HMDs with a motion detector for detecting motion of the observer's head.

In FIG. 7a, a forward-facing camera 320 is provided on the front of the HMD. This does not necessarily provide images for display to the user (although it could do so in an augmented reality arrangement). Instead, its primary purpose in the present embodiments is to allow motion sensing. A technique for using images captured by the camera 320 for motion sensing will be described below in connection with FIG. 8. In these arrangements, the motion detector comprises a camera mounted so as to move with the frame; and an image comparator operable to compare successive images captured by the camera so as to detect inter-image motion.

FIG. 7b makes use of a hardware motion detector 330. This can be mounted anywhere within or on the HMD. Examples of suitable hardware motion detectors are piezoelectric accelerometers or optical fibre gyroscopes. It will of course be appreciated that both hardware motion detection and camera-based motion detection can be used in the same device, in which case one sensing arrangement could be used as a backup when the other one is unavailable, or one sensing arrangement (such as the camera) could provide data for changing the apparent viewpoint of the displayed images, whereas the other (such as an accelerometer) could provide data for image stabilisation.

Figure 8:
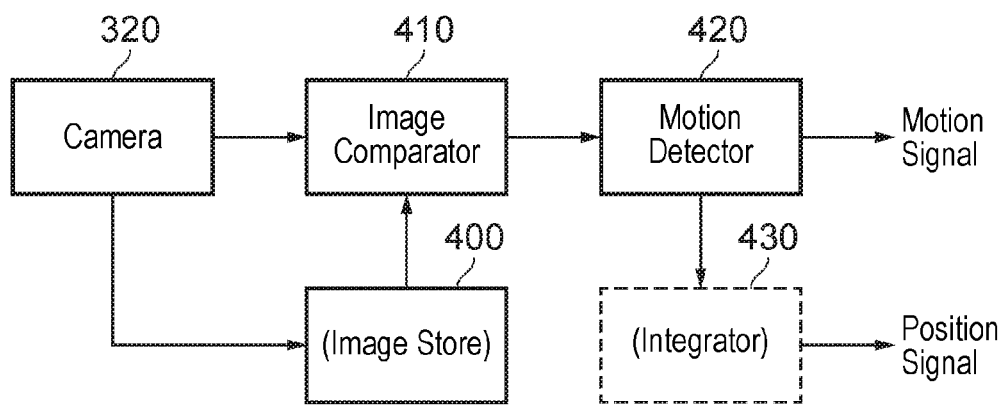
FIG. 8 schematically illustrates a position sensor based on optical flow detection.

FIG. 8 schematically illustrates one example of motion detection using the camera 320 of FIG. 7a.

The camera 320 is a video camera, capturing images at an image capture rate of, for example, 25 images per second. As each image is captured, it is passed to an image store 400 for storage and is also compared, by an image comparator 410, with a preceding image retrieved from the image store. The comparison uses known block matching techniques (so-called "optical flow" detection) to establish whether substantially the whole image captured by the camera 320 has moved since the time at which the preceding image was captured. Localised motion might indicate moving objects within the field of view of the camera 320, but global motion of substantially the whole image would tend to indicate motion of the camera rather than of individual features in the captured scene, and in the present case because the camera is mounted on the HMD, motion of the camera corresponds to motion of the HMD and in turn to motion of the user's head.

The displacement between one image and the next, as detected by the image comparator 410, is converted to a signal indicative of motion by a motion detector 420. If required, the motion signal is converted by to a position signal by an integrator 430.

As mentioned above, as an alternative to, or in addition to, the detection of motion by detecting inter-image motion between images captured by a video camera associated with the HMD, the HMD can detect head motion using a mechanical or solid state detector 330 such as an accelerometer. This can in fact give a faster response in respect of the indication of motion, given that the response time of the video-based system is at best the reciprocal of the image capture rate. In some instances, therefore, the detector 330 can be better suited for use with higher frequency motion detection. However, in other instances, for example if a high image rate camera is used (such as a 200 Hz capture rate camera), a camera-based system may be more appropriate. In terms of FIG. 8, the detector 330 could take the place of the camera 320, the image store 400 and the comparator 410, so as to provide an input directly to the motion detector 420. Or the detector 330 could take the place of the motion detector 420 as well, directly providing an output signal indicative of physical motion.

Other position or motion detecting techniques are of course possible. For example, a mechanical arrangement by which the HMD is linked by a moveable pantograph arm to a fixed point (for example, on a data processing device or on a piece of furniture) may be used, with position and orientation sensors detecting changes in the deflection of the pantograph arm. In other embodiments, a system of one or more transmitters and receivers, mounted on the HMD and on a fixed point, can be used to allow detection of the position and orientation of the HMD by triangulation techniques. For example, the HMD could carry one or more directional transmitters, and an array of receivers associated with known or fixed points could detect the relative signals from the one or more transmitters. Or the transmitters could be fixed and the receivers could be on the HMD. Examples of transmitters and receivers include infra-red transducers, ultrasonic transducers and radio frequency transducers. The radio frequency transducers could have a dual purpose, in that they could also form part of a radio frequency data link to and/or from the HMD, such as a Bluetooth® link.

Figure 9:
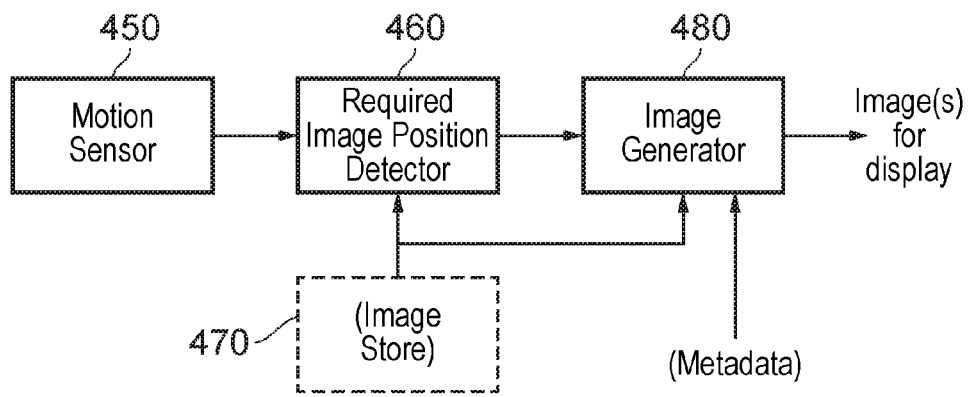
FIG. 9 schematically illustrates the generation of images in response to HMD position or motion detection.

FIG. 9 schematically illustrates image processing carried out in response to a detected position or change in position of the HMD.

As mentioned above in connection with FIG. 6, in some applications such as virtual reality and augmented reality arrangements, the apparent viewpoint of the video being displayed to the user of the HMD is changed in response to a change in actual position or orientation of the user's head.

With reference to FIG. 9, this is achieved by a motion sensor 450 (such as the arrangement of FIG. 8 and/or the motion detector 330 of FIG. 7b) supplying data indicative of motion and/or current position to a required image position detector 460, which translates the actual position of the HMD into data defining the required image for display. An image generator 480 accesses image data stored in an image store 470 if required, and generates the required images from the appropriate viewpoint for display by the HMD. The external video signal source can provide the functionality of the image generator 480 and act as a controller to compensate for the lower frequency component of motion of the observer's head by changing the viewpoint of the displayed image so as to move the displayed image in the opposite direction to that of the detected motion so as to change the apparent viewpoint of the observer in the direction of the detected motion.

The image generator 480 may act on the basis of metadata such as so-called view matrix data, in a manner to be described below.

Figure 10:
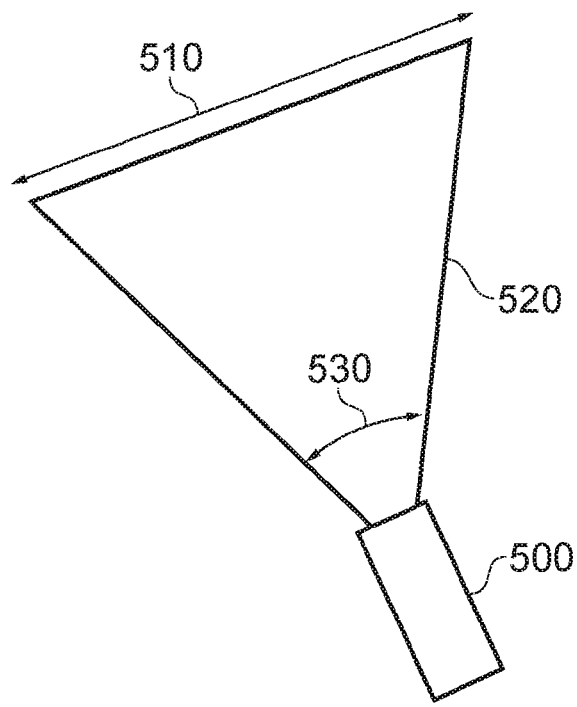
FIG. 10 schematically illustrates the capture of an image by a camera.
Figure 11:
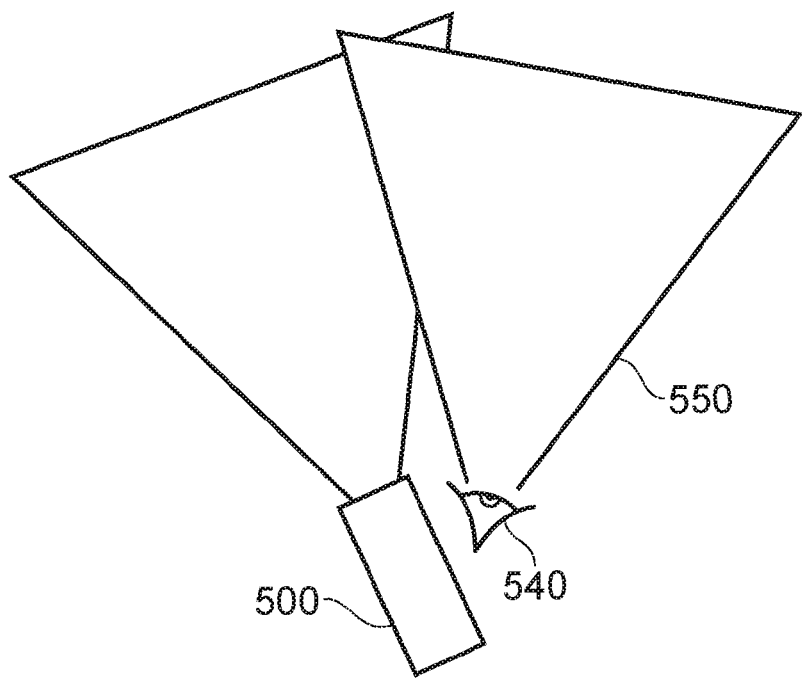
FIG. 11 schematically illustrates the re-projection of the captured image.

In order to illustrate schematically some of the general concepts associated with the present technology, FIG. 10 schematically illustrates the capture of an image by a camera and FIG. 11 schematically illustrates the re-projection of the captured image.

Referring to FIG. 10, a camera 500 captures an image of a portion 510 of a real-world scene. The field of view of the camera 500 is shown schematically as a generally triangular shape 520, such that the camera is at one apex of the generally triangular shape, the sides adjacent to the camera schematically indicate the left and right extremes of the field of view and the side opposite the camera schematically illustrates the portion of the scene which is captured. This schematic notation will be used in several of the following drawings.

To discuss the general concept of image re-projection, assume that in the arrangement of FIG. 10, not only the image is captured but also information defining a "view matrix" of the camera is also captured. Here, the view matrix may refer to the camera's position and/or orientation in space, either relative to a notional fixed point and orientation or expressed as changes with respect to the position and/or orientation applicable at a previous time (which may be the time associated with a preceding captured image, for example). So, in one expression, the view matrix could be considered as the x, y and z spatial position of the camera along with its rotational orientation expressed as yaw, pitch and roll (general terms indicative of three orthogonal rotational degrees of freedom) and its viewing frustum (a general term indicative of the field of view of the camera, ranging between a wide-angle field of view and a narrow angle or telephoto field of view, and which may be expressed as an angular range corresponding to, for example, the angle 530 shown in FIG. 10). The view matrix data need not comprise all of these data contributions. For example, in some arrangements, only a lateral rotational orientation (yaw) may be relevant. The choice of which data items to include within the view matrix data is therefore a matter for the system designer, taking into account the expected uses of the captured images and view matrix data.

In embodiments of the disclosure, the view matrix data is stored in association with the captured image, for example as so-called metadata which is stored and/or transmitted as part of the overall image data package, for example by a camera apparatus such as that described below with reference to FIG. 27 comprising an image capture device for capturing an image; a position and/or orientation detector for detecting the position and/or orientation of the camera apparatus at the time of capture of the image; and a metadata generator for associating metadata with the image, the metadata indicating the detected position and/or orientation of the camera apparatus at the time of capture of the image.

Note that the camera 500 may be a stills camera or a video camera capturing a succession of images, separated by time intervals.

FIG. 11 schematically illustrates the re-projection of the image captured by the schematic camera of FIG. 10 according to a viewpoint of a viewer. The viewpoint 540 is schematically illustrated by an eye symbol and a generally triangular shape 550 which is similar to the triangular shape 520 discussed above. In order to display the image captured by the camera 500 so that it is appropriate for viewing according to the viewpoint shown in FIG. 11, a process is carried out which relates the view matrix (as discussed above) of the viewpoint to the view matrix of the camera 500. Examples of such techniques will be described with reference to FIGS. 12 and 13. Further examples are discussed in Seitz: "Image Based Transformation of Viewpoint and Scene Appearance", PhD Dissertation, Computer Sciences Department Technical Report 1354, University of Wisconsind—Madison, October 1997, the content of which is incorporated herein by reference.

Figure 12:
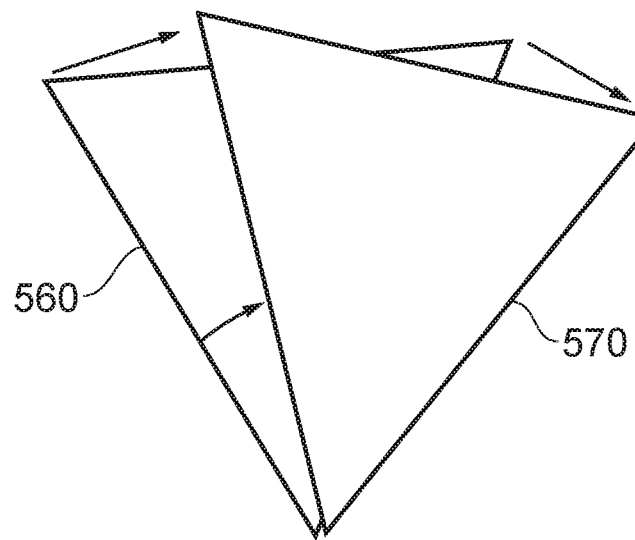
FIG. 12 schematically illustrates an image rotation.

FIG. 12 schematically illustrates an image rotation from a first view matrix 560 to a second view matrix 570. Re-projection of this type involves simply rotating and scaling the image so as to correct for any differences in field of view and orientation between the view matrix of the camera and the view matrix of the user viewpoint. Examples of this type of re-projection will be discussed below with reference to FIGS. 16 and 17.

Figure 13:
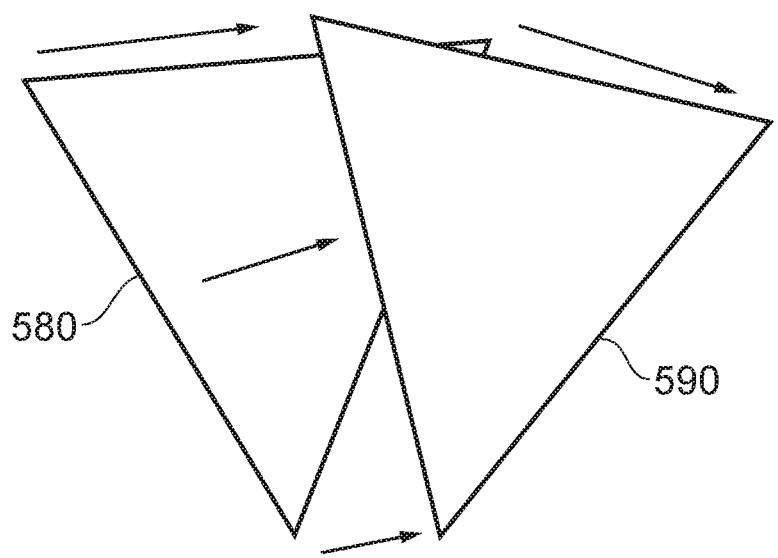
FIG. 13 schematically illustrates an image rotation and translation.

FIG. 13 schematically illustrates an image rotation and translation from a first view matrix 580 to a second view matrix 590. Here, the processing is slightly more involved, and may also use a depth map, indicating the image depth of different image features in the captured image, to allow the user viewpoint to be translated with respect to the viewpoint of the camera. Examples of the use of a depth map will be discussed below with reference to FIGS. 18-20.

Note that the images do not have to be camera-captured images, and indeed the discussion of a physical camera has just been provided to illustrate general aspects of the techniques. These techniques are all equally applicable to machine-generated images such as images generated by a computer games machine for displayed to the user as part of the process of playing a computer game. In such an environment, a virtual camera representing an in-game viewpoint may be implemented.

Figure 14:
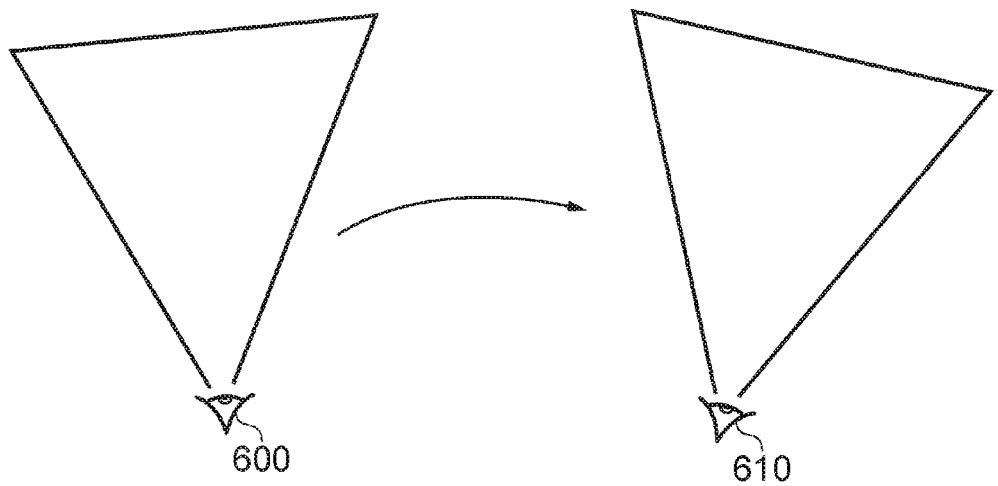
FIG. 14 schematically illustrates a latency issue with HMD image display.

FIG. 14 schematically illustrates a latency issue with image display. As discussed above, the position and/or orientation of an HMD can be used, for example as discussed with reference to FIG. 9, so that an image for display is rendered according to the detected position and/or orientation of the HMD. In the case of viewing a portion of a wider captured image, or generating a required image as part of computer game play, the arrangement discussed with reference to FIG. 9 involves detecting the current position and/or orientation of the HMD and rendering an appropriate image for display.

However, the latency involved in this process can lead to an incorrect image being generated.

Referring to FIG. 14, consider a situation in which the user's viewpoint is rotating (in a clockwise direction as illustrated schematically in FIG. 14) from a first viewpoint 600 to a second viewpoint 610, over the course of a time interval of the order of an image repetition period of the image displays used in the HMD (for example, 1/25 second). Note that the two representations in FIG. 14 are shown side-by-side, but this is for the purposes of the drawing rather than necessarily indicating a translation of the user viewpoint (although some translation could be involved between the two viewpoints).

In order to allow time for the next output image to be rendered, the position and/or orientation of the HMD is detected when the HMD is at the viewpoint 600. The next image for display is then rendered, but by the time that image is actually displayed, the viewpoint has rotated to the viewpoint 610. The result is that the image is displayed is incorrect for the user's viewpoint 610 at the time that image is displayed. This can provide a subjectively poorer experience for the user, and may possibly lead to disorientation or even nausea on the part of the user.

Techniques which address this problem will now be discussed.

Figure 15:
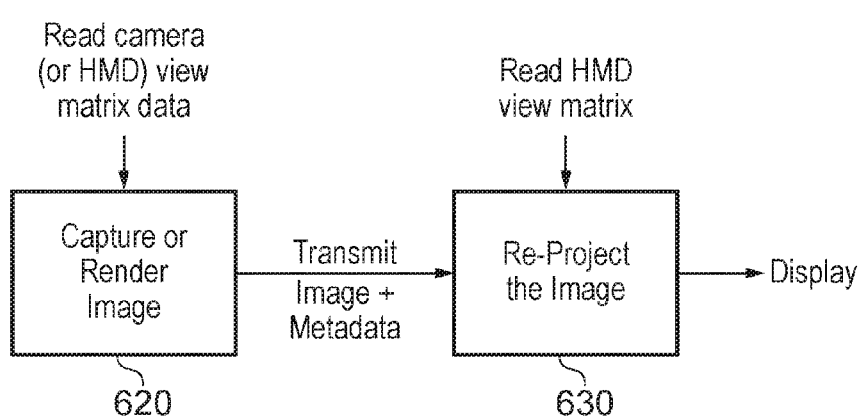
FIG. 15 is a schematic flow chart illustrating an image processing technique.

FIG. 15 is a schematic flow chart illustrating an image processing technique. The technique will first be discussed at a high level, and then more detail will be given below.

The features of the technique shown in FIG. 15 involve capturing or rendering an image (at a step of 620) according to the view matrix of the camera (in the case of a captured image) or the view matrix of the HMD (in the case of an image rendered by, for example, a computer game).

In the latter example, the image would be rendered according to the view matrix corresponding to the viewpoint 600 in FIG. 14. In other words, the technique involves detecting an initial position and/or orientation of the viewer's head and generating an image for display according to the detected position and/or orientation. The image is then transmitted or passed to the HMD along with metadata defining that view matrix (that is to say, the view matrix according to which the image was captured or first rendered). At the time of display, the HMD view matrix is again detected (in other words, detecting a current position and/or orientation of the viewer's head at a time at which the image is to be displayed) and, at a step 630, the image is re-projected based on the metadata indicating the original view matrix and the view matrix detected from the HMD at the time of display (in the terminology of FIG. 14, this would be the view matrix corresponding to the viewpoint 610, so that the technique involves associating metadata with the generated image, the metadata indicating the initial position and/or orientation of the viewer's head). So, the technique involves re-projecting the generated image according to any differences between the initial position and/or orientation and the current position and/or orientation of the viewer's head and displaying the re-projected image using the display.

In the case of a captured image, the view matrix of the camera is generally not within the control of the display arrangements and so this technique provides a way of compensating for differences between the two view matrices. In the case of image rendering, however, the issues are slightly different. However, a significant feature is that the time taken to process a re-projection operation can be much less than the time taken for a full rendering operation to generate an output image. In turn, this means that the rendering operation has to start earlier relative to the time of display which can lead to the latency problems with regards to detection of the appropriate viewpoint to use for the rendering operation, as discussed with reference to FIG. 14. By contrast, using the technique described with reference to FIG. 15, the rendering operation takes place relative to a viewpoint (such as the viewpoint 600) which is correct at the time that the rendering operation is initiated, but the viewpoint is then adjusted (to the viewpoint 610, for example) at the time of display. This avoids the need to try to predict the viewpoint 610 in advance, which could also lead to errors in the viewpoint, but provides an image for displayed to the user at the appropriate viewpoint corresponding to the display time. Accordingly, the technique can involve receiving an image and associated metadata, detecting a current position and/or orientation of the viewer's head at a time at which the image is to be displayed, re-projecting the received image according to any differences between the position and/or orientation indicated by the metadata and the current position and/or orientation of the viewer's head, and displaying the re-projected image. This provides an example of associating metadata with the generated image, the metadata indicating the initial position and/or orientation of the image view.

In examples, the timing of the process can proceed as follows:

At a time $t_0$, the HMD view matrix data (representing the HMD's position at $t_0$) is detected. the step 620 is initiated and takes a period $T_{render}$.

At a time $t_0+T_{render}$, the required image has been rendered.

The image is then transferred to the HMD. This can take a period of zero or more seconds (the period would be zero if, for example, the image had been rendered at the HMD). But in general, a period $T_{delivery}$ is noted for the time taken to deliver the image to the HMD ready for display.

At a time $t_0+T_{render}+T_{delivery}$, the HMD view matrix data is again detected. This could correspond to the required display time, in which case (according to the derivation below) the image would be displayed late by an amount $T_{reproj}$, or it could be carried out at a time equal to a display time $T_{display}-T_{reproj}$. In either case it is carried out at a time dependent upon a required display time.

The image is then re-projected (at the step 630) to account for differences between the initial and the latest view matrices. The time period taken for the re-projection is $T_{reproj}$, assumed here to be much less than (or at least less than) $T_{render}$.

The image is then displayed at a time:

$$t_0+T_{render}+T_{delivery}+T_{reproj}.$$

Therefore, when the image is displayed, its maximum positional error corresponds to the movement of the HMD in the period $T_{reproj}$, whereas without the present technique, the maximum positional error corresponds to the movement of the HMD in the larger period $T_{render}+T_{delivery}$.

These are therefore examples of a generating step taking a period of time equal to at least an image generating latency, and a re-projecting step taking a period of time equal to at least an image re-projection latency, the image generating latency being longer than the image re-projection latency.

In the above examples, the detected initial position is detected at a latest time, allowing for the image generating latency and the image re-projection latency, to allow for the display of the re-projected image at the display time.

Worked examples of this technique will be discussed below.

Figure 16:
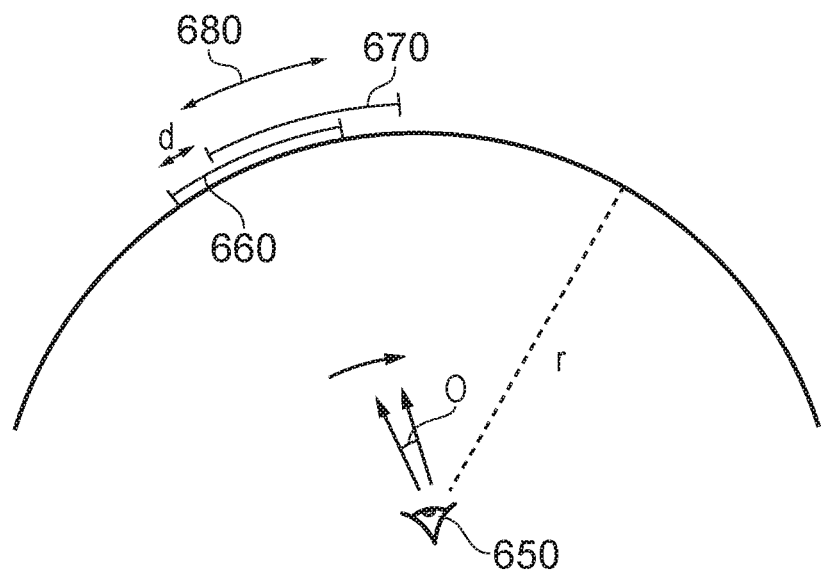
FIG. 16 schematically illustrates the rotation of an HMD.

FIG. 16 schematically illustrates the rotation of an HMD viewpoint 650 in a clockwise direction.

Figure 17:
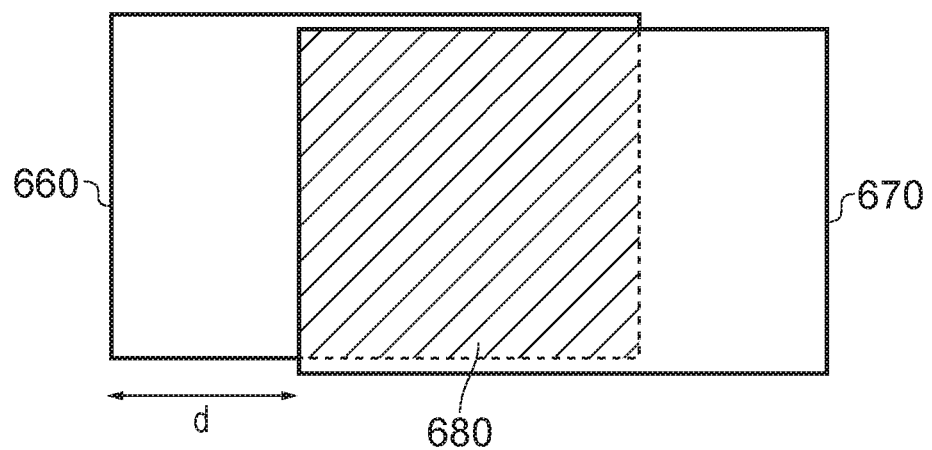
FIG. 17 schematically illustrates image position subtraction.

FIG. 16 is similar to FIG. 6 discussed above, in that the image for display is considered to lie on the surface of a sphere of radius r, where r is substantially equal to the distance from the user's eye to the virtual image generated by the HMD display system. Under this arrangement, a rotation of the viewpoint 650 by an angle θ can be considered as a lateral movement on the surface of the sphere of radius r by a lateral distance d. Such a displacement d is schematically illustrated in FIG. 17. If it is assumed that an image generated at the step 620 is represented by an image 660 in FIG. 16, and an image generated at this step 630 is represented by an image 670 in FIG. 16, it may be seen that the two images may be represented side-by-side from the point of view of the user. (Note that in FIG. 17, a small vertical displacement is shown just to allow the different images to be distinguished from one another in the drawing).

In a simple example, in order to generate (at the step 630) an appropriate image 670 for display to the user, a "subtraction" operation is carried out, which is a schematic term to illustrate the operation of detecting the overlap between the required display position of the image 670 and the actual position of the image 660, so as to display within the image 670 the overlapping portion 680 (shaded in FIG. 17) of the image 660. In other words, the re-projecting comprises detecting an overlapping portion between the generated image and the required re-projected image, and reproducing the overlapping portion as part of the re-projected image.

In embodiments of the present disclosure, the missing areas in the image 670 (those parts not shown as shaded) may be masked or filled in using image data from, for example, a panoramic image captured or prepared for this purpose and stored by the display arrangement, or from a preceding image, directly or after pre-processing. So, embodiments of the technique can therefore comprise filling portions of the re-projected image other than the overlapping portion with image material from a further image source.

Figure 18:
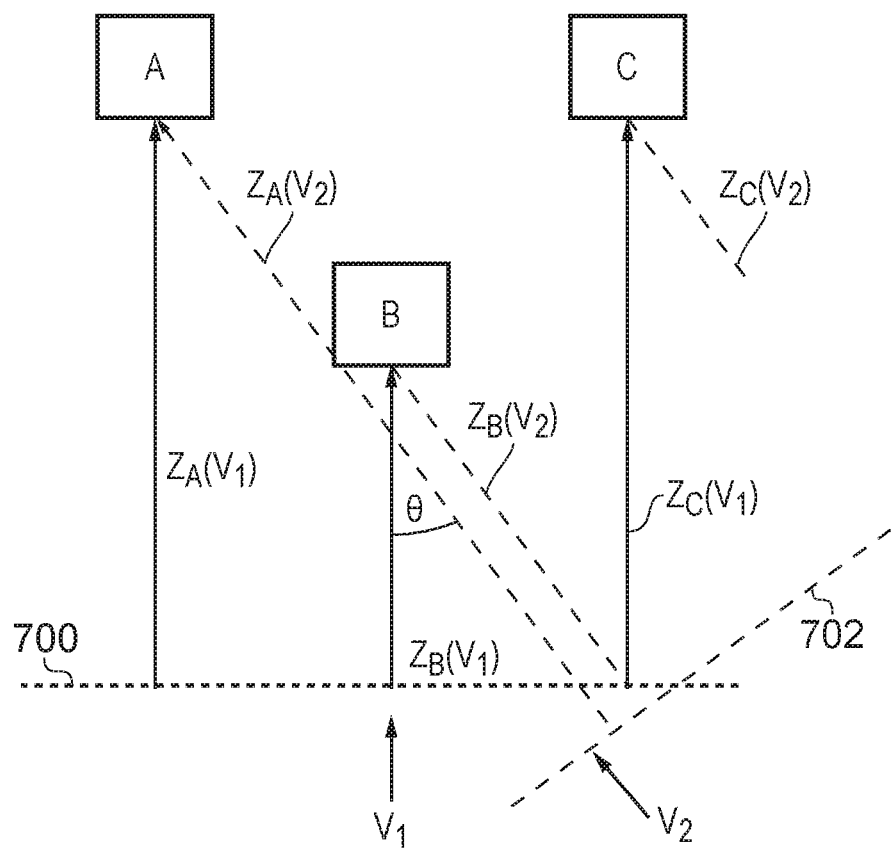
FIG. 18 schematically illustrates a depth map.

In order to re-project images by taking into account translations of the viewpoint, embodiments of the disclosure can use that information associated with the images. FIG. 18 schematically illustrates a depth map which may be derived, for example, from image data captured by a 3-D (binocular) camera or a so-called Z-camera, or which may be generated as part of the operation of a computer games machine's rendering engine.

In the schematic example of FIG. 18, three image objects are labelled as objects A, B and C. Two potential viewpoints are shown, labelled as a viewpoint $v_1$ and a viewpoint $v_2$ respectively.

The objects are shown with respect to a viewpoint $v_1$, are at respective image depths measured from an arbitrary depth position 700 of $z_A(v_1)$, $z_B(v_1)$ and $z_C(v_1)$.

If the viewpoint is changed to a viewpoint $v_2$ at an angle θ to that of the viewpoint $v_1$, then the arbitrary depth position 700 rotates by θ to a revised position 702 and the respective image depths measured from the arbitrary depth position 702 are $z_A(v_1)$, $z_B(v_1)$ and $z_C(v_1)$, where for each object in this example, $z(v_2)=z(v_1)\cdot\cos(\theta)$.

Figure 19:
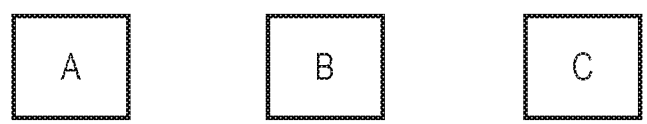
FIGS. 19 and 20 schematically illustrate images according to different respective viewpoints.
Figure 20:

FIGS. 19 and 20 schematically illustrate portions of images according to the viewpoint $v_1$ and the viewpoint $v_2$ respectively. At a rendering stage, the depth of each of the image objects is taken into account in generating the images. However, this technique can also be used at a re-projection stage such as that defined by the step 630 discussed above, so that image objects may be moved relative to one another in the re-projected image according to their respective image depths. Accordingly, the technique can involve providing depth data indicating the image depth of one or more image features, and the re-projecting can comprise repositioning one or more image features within the re-projected image according to the depth data.

Figure 21A:
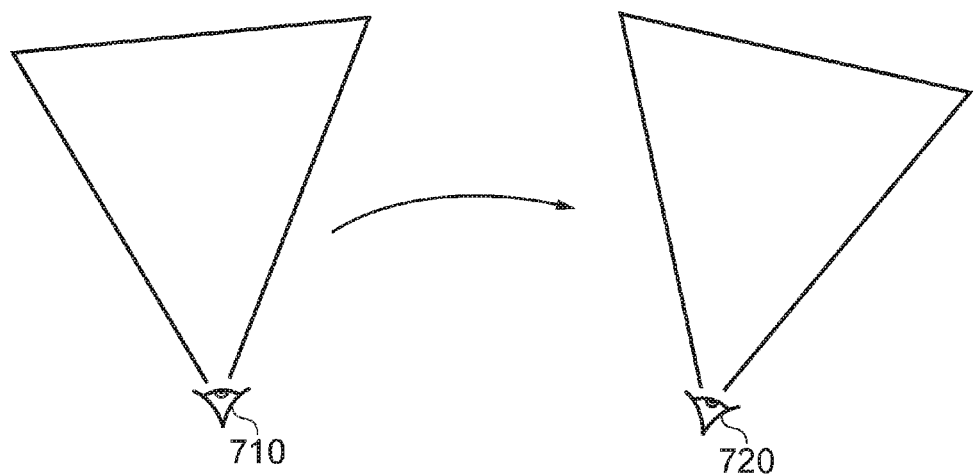
FIGS. 21a and 21b schematically illustrate techniques for image rendering and re-projection to compensate for HMD motion.
Figure 21B:
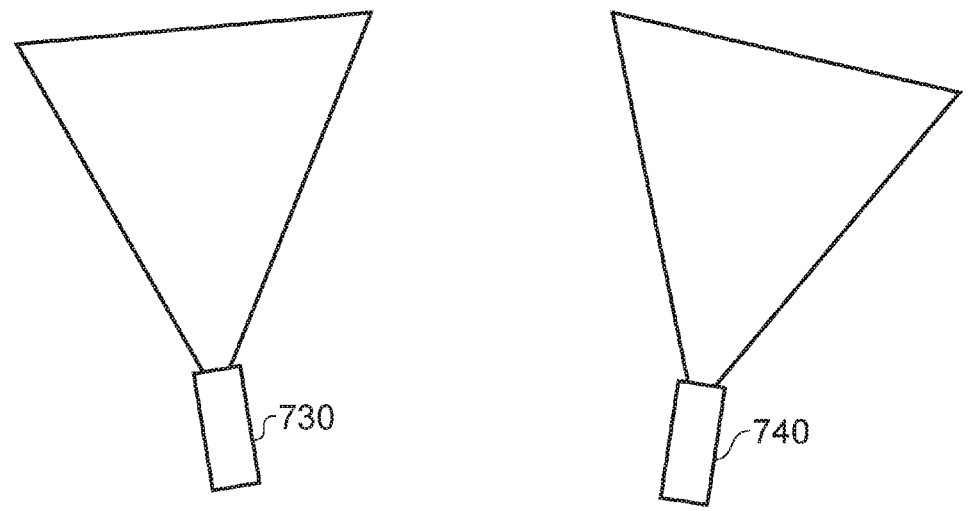

FIGS. 21a and 21b schematically illustrates a technique for image rendering and re-projection to compensate for HMD motion. In FIG. 21a, in a similar manner to FIG. 14, a user viewpoint moves or rotates from a viewpoint 710, detected as part of the step 620 of FIG. 15, to a viewpoint 720 detected as part of the step 630 of FIG. 15 and according to which the image for display is re-projected. In this way, an image according to the correct viewpoint 720 is displayed to the user. Similarly, in FIG. 21b, the view matrix of an in-game camera 730 moves from a first view matrix 730 to a second view matrix 740. The change in view matrix is detected and the camera view is re-projected accordingly. This provides an example of an image view which is an in-game camera view of a computer game.

Figure 22:
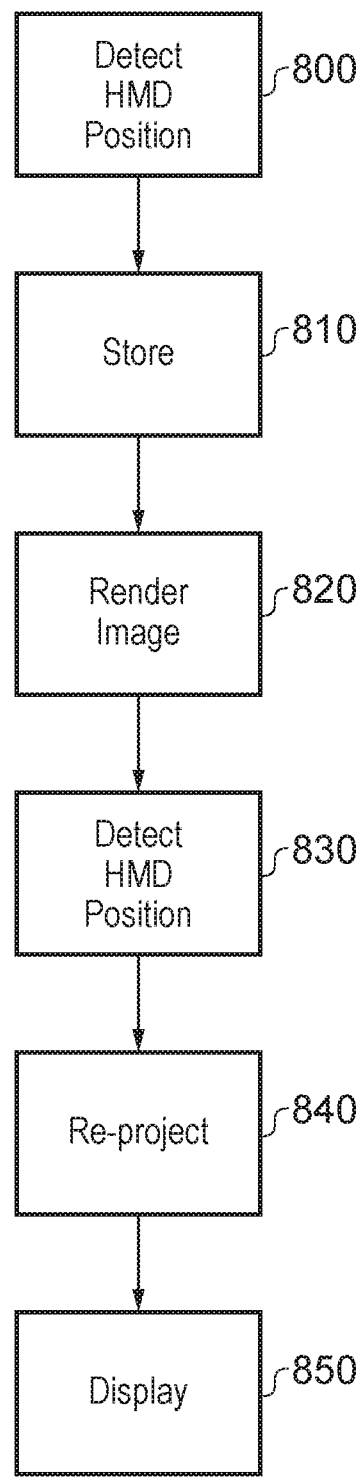
FIG. 22 is a schematic flowchart relating to the technique shown in FIG. 21.

In more detail, FIG. 22 is a schematic flowchart relating to the technique shown in FIGS. 21a and 21b. In FIG. 22, process steps 800, 810, 820, 830, 840 and 850 are shown. Of these, the steps 800, 810 and 820 correspond generally to the step 620 of FIG. 15. The remaining steps 830, 840 and 850 correspond generally to the step 630 of FIG. 15. Note that in some examples, each of the steps in FIG. 22 could be carried out immediately (or substantially immediately) in response to completion of the preceding step.

At the step 800, the current position of the HMD (corresponding to the position 710 of FIG. 21) is detected and, at the step 810, is stored (for example in a temporary working memory forming part of the HMD or the computer games machine). At the step 820, an image for display is rendered according to the viewpoint 710.

At the time at which the rendered image is to be displayed, or at a time interval t before the instant at which the image is to be displayed, where t is the length of time required for the re-projection operation, the HMD position is again detected at the step 830 which, in this example, will detect the position 720. The image for display is re-projected as discussed above at the step 840 and is displayed to the user at the step 850.

Figure 23:
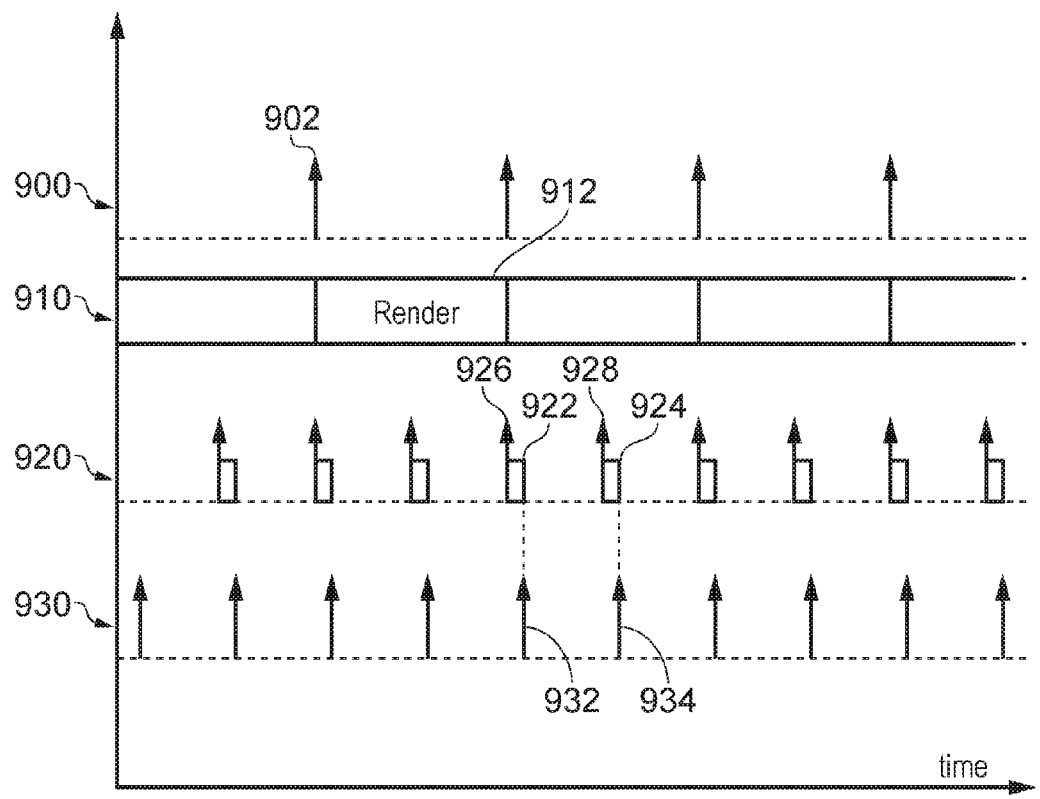
FIG. 23 is a schematic timing diagram of an image rendering and re-projection process.

FIG. 23 is a schematic timing diagram of an image rendering and re-projection process, in which time is represented from left to right along a horizontal axis.

The arrangement to be discussed below makes use of re-projection to improve the rendering of video content, for example videogame content, at a high frame rate. In particular, in some examples, portions of the images for display are generated, using a re-projection process, at a higher frame rate than other portions. In other examples, portions of the images for display are initially rendered at a lower frame rate than other portions, but are then processed, using a re-projection process, for display at the same (higher) frame rate as those other portions. Such an arrangement is useful in systems where there is a desire to output images at the higher frame rate but the processing resources of the system cannot cope with generating the entirety of an image at the higher frame rate.

A row 900 of FIG. 23 represents a "base" frame rate (image rate). For example, the base frame rate may be 60 Hz or 30 Hz, although other values may of course be used. In the present example, for the purposes of the discussion, a base frame rate of 30 Hz will be assumed.

In the system under discussion, however, there is a desire to display output images at a higher image rate than the base frame rate. This higher rate will be referred to as the "high frame rate" in the discussion which follows, to distinguish it from the "base frame rate". In some examples, the high frame rate could be a multiple of the base frame rate, for example double the base frame rate (60 Hz in this example). In other examples, a different multiple could be used. In further examples, the high frame rate could be greater than the base frame rate but not related to the base frame rate by a simple rational multiplier. Indeed, images at the high frame rate could be generated by a process which is asynchronous relative to the image rendering process. But for the purposes of the discussion below, a high frame rate of 60 Hz will be assumed.

As an overview of the first example of the process to be discussed, some portions of the images for display are rendered at the base frame rate. In the examples to be discussed, these portions represent moving (for example, relative to a net or average movement at the in-game view), transparent and/or foreground objects such as objects tagged as foreground objects and/or an avatar representing a user within a game environment. These portions of the image are used, as part of output images for display, until a further version of the portions has been rendered as part of a next image. Other portions of the images for display are rendered at the base frame rate but also re-projected at the high frame rate. In the examples to be discussed, these re-projected portions represent background image portions.

Both of the rendering and the re-projection processes are carried out on the basis of the view matrix data. For example, this may relate to the wearer's current position of an HMD, but in other examples the view matrix data relates to the position, in a videogame, of an in-game camera. In such arrangements, it does not matter whether the user is wearing an HMD or viewing the game on a conventional display screen, as it is the position and/or orientation of the in-game camera which determines the rendering and re-projection.

A row 910 schematically illustrates a rendering process which is carried out at the base frame rate in response to game data, that is, information about the current progress and status of the videogame, and sampled view matrix data relating to the view matrix of the inter-game camera. So, for example, a render process 912 is carried out in response to view matrix data sampled at a sampling point 902. The render process 912 takes (in this example) substantially the whole of the period corresponding to the base frame rate (that is to say, the reciprocal, in time, of the base frame rate). In the example of a base frame rate of 30 Hz, the period corresponding to the base frame rate is 33.3 ms.

A row 920 schematically illustrates the generation of output images for display. This process occurs at a higher frame rate than the base frame rate (as mentioned above, this is referred to as the "high frame rate") which in this example is 60 Hz. A re-projection process 922, 924 is carried out in response to sampling of the camera view matrix at sample points 926, 928 and so on. Note that the sample point 926 may (depending upon the design, the choice of high and base frame rates and the synchronisation in use) be temporarily aligned with a corresponding one of the sample points in the row 900, in which case, of course, only one sampling process needs to be carried out.

Both the re-projection process 922 and the re-projection process 924 make use of data generated during the render process 912. At the end of the respective re-projection processes 922, 924, images are output at time points 932, 934 in a row 930 of FIG. 23.

In this way, the basic process for image rendering takes place at the base frame rate, but images can be output for display at the high frame rate, higher than the base frame rate.

As an overview of a second example of the process, some portions of the images for display are rendered at the higher base frame rate. In examples, these portions represent moving, transparent and/or foreground objects such as an avatar representing a user within a game environment. These portions of the image are used, as part of output images for display, until a further version of the portions has been rendered as part of a next image. Other portions of the images for display are rendered at the base frame rate but also re-projected at the high frame rate. In the examples to be discussed, these re-projected portions represent background image portions.

Therefore, in the first example, both sets of portions (foreground and background in the example) are rendered at the base frame rate. But for display, the background portions are re-projected to a higher frame rate. In the second example, foreground portions are initially rendered at the higher frame rate. Background portions are initially rendered at the base frame rate but are then re-projected to the higher frame rate for display.

Figure 24:
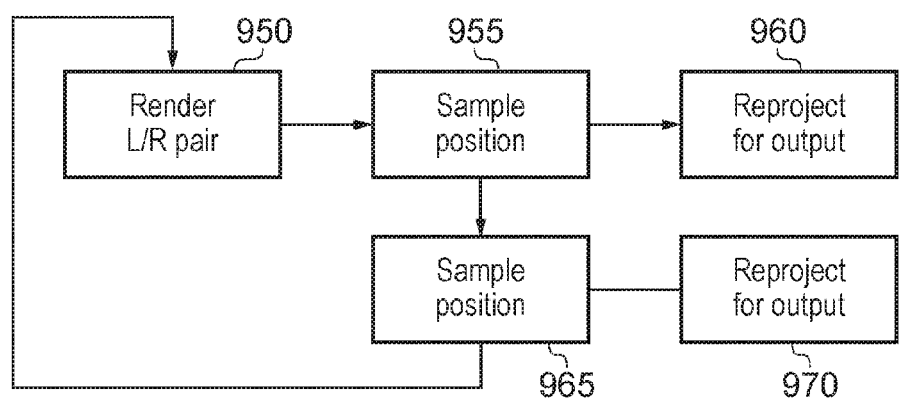
FIG. 24 is a schematic flow chart of an image rendering and re-projection process.

FIG. 24 is a schematic flow chart of an image rendering and re-projection process according to the timing diagram discussed with reference to FIG. 23.

At a step 950, a base image is rendered, corresponding to the rendering process 912 of FIG. 23. In fact, in the case of a stereoscopic display, each image is represented by a left-right pair of stereoscopic images, but as the processing applied by the present techniques is the same for each of those images, the processing of only one of the left-right pair of images will be discussed in detail. It will be understood that corresponding processing is applied to the other of the left-right pair of images.

At a step 955, after the rendering step 950 has completed, the view matrix of the in-game camera is sampled (corresponding to the sampling point 926 of FIG. 23 and an image is re-projected for output at a step 960 (corresponding to the re-projection process 922 of FIG. 23). One period of the high frame rate later, the in-game camera view matrix is again sampled at a step 965 (corresponding to the sample point 928 of FIG. 23) and a further image is re-projected for output at a step 970 (corresponding to the re-projection process 924 of FIG. 23).

In some examples, the whole of each image could be re-projected at the steps 922, 924. However, in some examples to be discussed below, only portions of each image re-projected, with those portions than being combined with non-re-projected portions.

Figure 25:
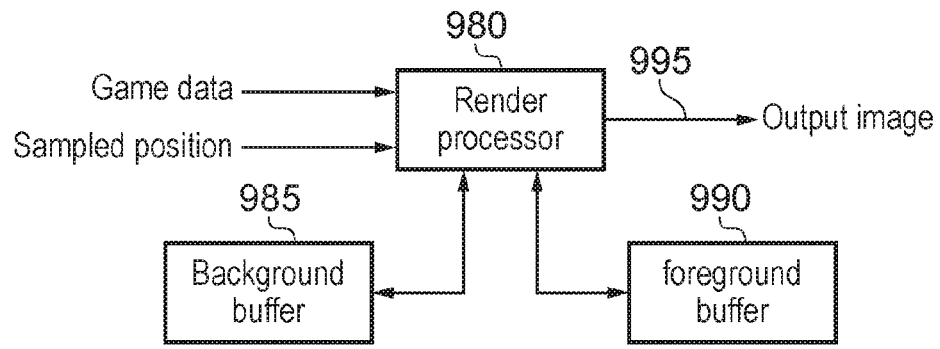
FIG. 25 schematically illustrates a render process and render buffers.

FIG. 25 schematically illustrates a render processor 980 and a pair of render buffers 985, 990. In particular, rendered image objects are partitioned between a background buffer 985 and a foreground buffer 990. Examples of foreground objects include an avatar associated with the user and objects attached (in a virtual sense) to the in-game camera, which is to say, objects which move with the in-game camera. Other objects are classified as background objects. The render processor 980 is responsive to game data indicative of a current game status and to sampled view matrix data indicative of the view matrix of the in-game camera. The render processor carries out processing of the type discussed below, with reference to the contents of the background buffer 985 and the foreground buffer 990, to generate output images 995.

Figure 26:
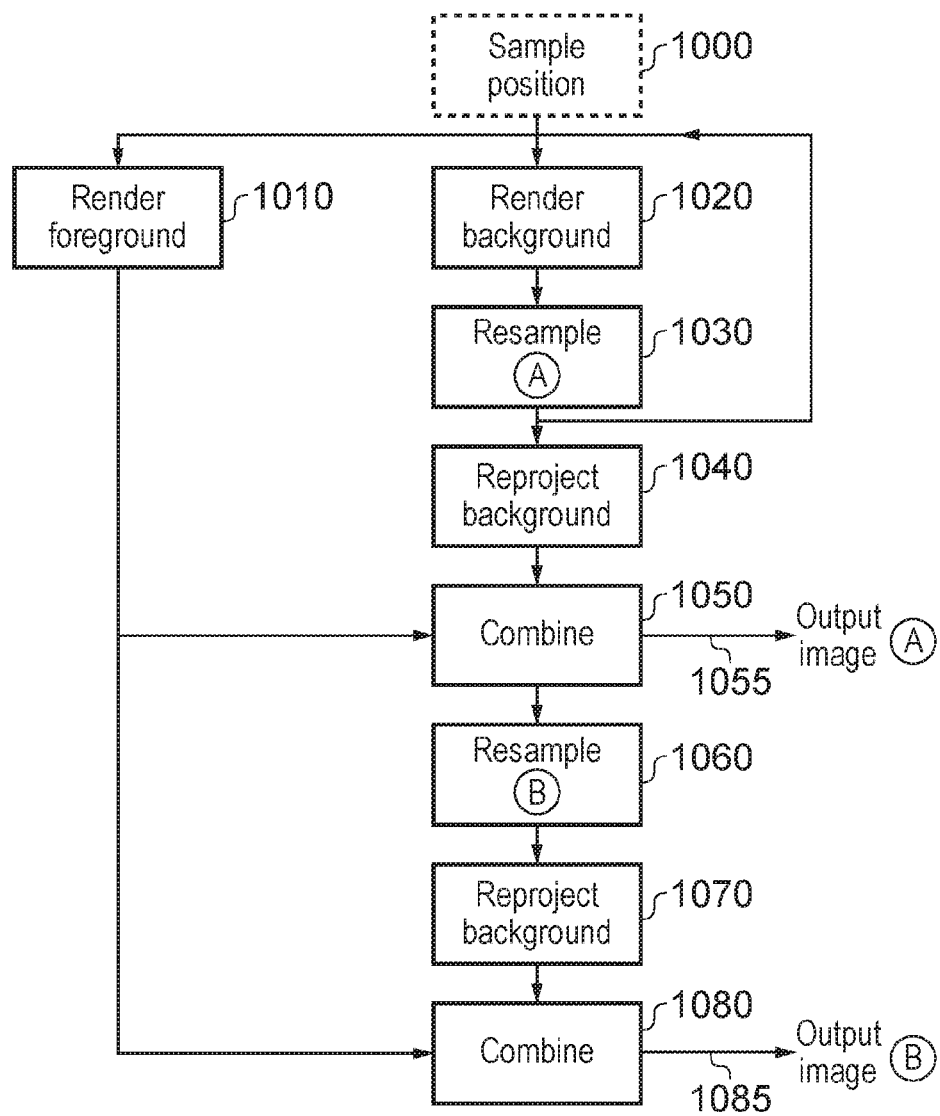
FIG. 26 is a more detailed schematic flow chart of an image rendering and re-projection process.

FIG. 26 is a more detailed schematic flow chart of an image rendering and re-projection process. In particular, the flow chart of FIG. 26 is a more detailed version of the process discussed with reference to FIG. 24.

A step 1000, representing a process of sampling the in-game camera view matrix, is shown in broken line because it may be that a sampling step of a preceding iteration of the overall process makes the step 1000 redundant. But for now, at the start of the process shown in FIG. 26, the view matrix of the in-game camera is sampled at the step 1000. Based on the sampled view matrix, at a step 1010 foreground objects are rendered and stored in the foreground buffer 990. Also, at a step 1020, background objects are rendered and are stored in the background buffer 985. Note that as discussed earlier, the step 1010 can be carried out (as in the example under discussion here) at the base frame rate. But in other examples, the step 1010 can be carried out at the high frame rate (for example, at the image display rate), for example based on successive detections of the HMD position and/or orientation. In the former case, the images supplied to the steps 1050 and 1080 (in respect of a particular base frame rate period) could be the same image. In the latter case, the images supplied to the steps 1050 and 1080 could be different foreground images.

At a step 1030, the view matrix of the in-game camera is again sampled (or "resampled"). This corresponds to the sampling process at the time point 926 in FIG. 23. Based on the resampled view matrix, the background is re-projected at a step 1040 and, at a step 1050 the previously rendered foreground and the re-projected background are combined to generate an output image 1055 (corresponding to the image output at the point in time 932 in FIG. 23). One period of the high frame rate after the step 1030, the view matrix of the in-game camera is again sampled at a step 1060 (corresponding to the sampling at the point in time 928) and, in response to the sampled view matrix of the in-game camera the background is re-projected at a step 1070. Note that the step 1070 may act in respect of the originally rendered background stored in the background buffer, as rendered by the step 1020. However, in other embodiments, the re-projected background as processed by the step 1040 could be used as the input to the step 1070. Accordingly, in the case where the background portions relating to "most recent image" are re-projected, that the most recent image could, for example, comprise a most recent image for display or a most recently rendered image.

At a step 1080 the buffered foreground stored in the foreground buffer 990 from the rendering step 1010 is combined with the re-projected background from the step 1070 to generate an output image 1085 for display.

Control returns to the step 1010, 1020 from the output of the sampling step 1030 so that the next rendering process can continue while the re-projection processes are being carried out.

Figure 27:
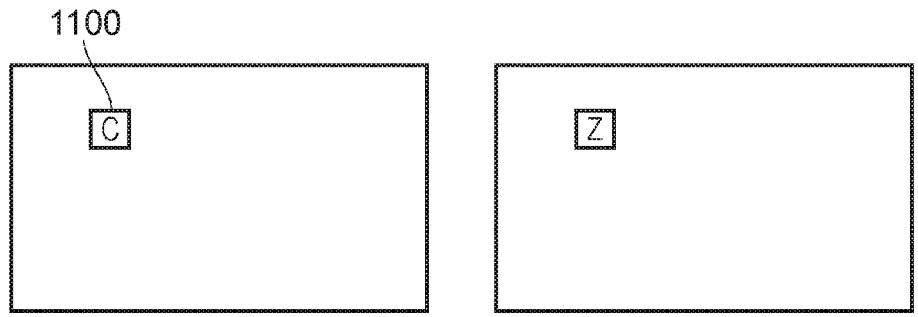
FIG. 27 schematically illustrates a render buffer.

FIG. 27 therefore provides an example of a display method using a display (such as the HMD discussed above having a display device or screen, but this could be a separate display screen) operable to display an image to a viewer, the method comprising:

detecting an initial position and/or orientation of an image view (for example, the step 1000);

rendering foreground portions of an image according to the detected initial position and/or orientation (for example, the step 1010). As discussed, this could be (for example) at the image rendering rate discussed below or at a higher rate such as the image display rate discussed below.

rendering background portions of the image according to the detected initial position and/or orientation, at an image rendering rate (for example, the step 1020);

at an image display rate higher than the image rendering rate:

(i) detecting a current position and/or orientation of the image view (for example, the steps 1030, 1060);

(ii) re-projecting the background portions of a most recent image according to any differences between the initial position and/or orientation and the current position and/or orientation of the image view (for example, the steps 1040, 1070); and (iii) combining the foreground portions and the re-projected background portions to generate an image for display (for example, the steps 1050, 1080).

In examples, the display is a head-mountable display and the position and/or orientation of the viewer's head is detected as a position and/or orientation of an image view by detecting a position and/or orientation of the head-mountable display.

FIG. 27 schematically illustrates a render buffer such as the background buffer 985 of FIG. 25. For each pixel position, where one pixel position is shown schematically as a small square 1100 in FIG. 27, colour information (C) and depth information (z) are stored by the render buffer. The colour information indicates the colour properties (including brightness) of a pixel to be displayed at that position. The depth information indicates a depth value associated with that pixel, such that in a combination with other image data, the pixel with a depth value representing a position closest to the viewer will take precedence over another pixel at the same position. As mentioned, the rendered background is stored in the background buffer 985 in the format shown in FIG. 27.

Figure 28:
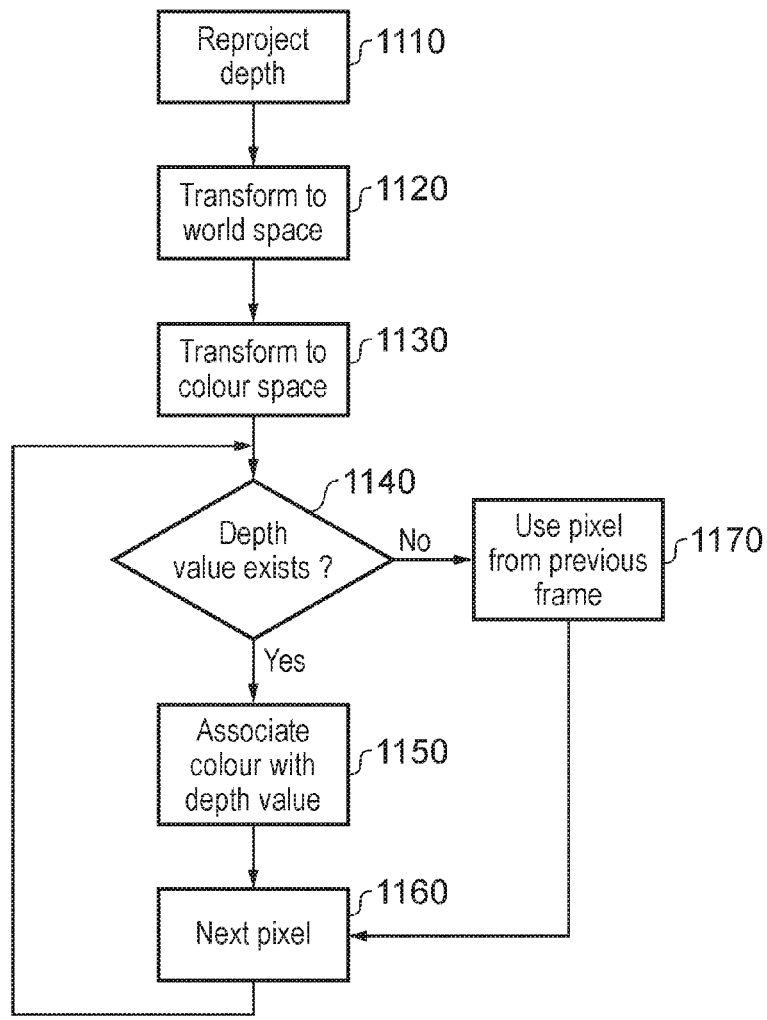
FIG. 28 is a schematic flow chart of an image re-projection process.
Figure 29:
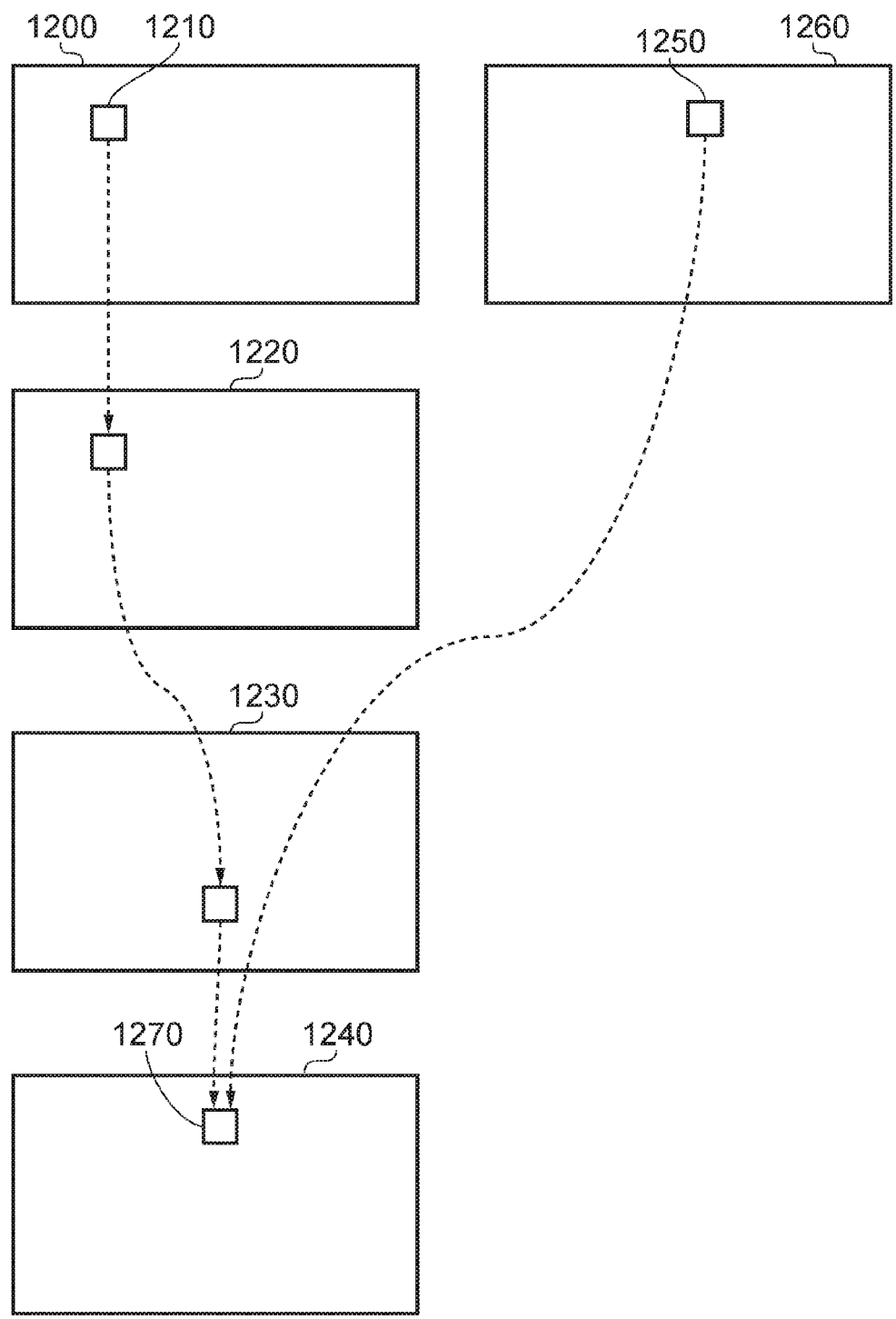
FIG. 29 schematically illustrates a depth buffer transformation process.

FIG. 28 is a schematic flow chart of an image re-projection process as applied to the rendered background stored in the background buffer 985. FIG. 29 schematically illustrates the depth buffer transformation process using schematic representations of the data being processed.

A step 1110 represents a re-projection process as applied to the depth information (z) of the rendered background and associated with each pixel position, as described with reference to FIG. 18 above. In FIG. 29, the depth value contents of the background buffer 985 are shown schematically as an array of depth values 1200 with a particular value 1210 being identified for the purposes of this explanation.

This generates a re-projected set of depth values (1220, FIG. 29, in which the value stored in respect of the pixel position 1210 has been changed by the re-projection process) which can either be stored in a separate buffer or can be used to overwrite the original depth values stored in the background buffer 985. Here, the choice between these two arrangements depends at least in part on whether a subsequent re-projection process is to be carried out with reference to the originally rendered background or to the re-projected background; if the originally rendered background is to be re-used later, and the re-projected depth values need to be stored in a separate buffer (not shown).

Accordingly this is an example of the generating step comprising providing depth data indicating the image depth of one or more image features; and the step of re-projecting comprising re-projecting the depth data.

At a step 1120, the re-projected depth values are transformed to values 1230 in a world coordinate space, or in other words a world coordinate reference as applied to the entire virtual world of the game system, and at a step 1130 the depth values in the world coordinate space are transformed to values 1240 in the coordinate space of the colour information (C). This is an example of the step of re-projecting comprising mapping the re-projected depth data to a coordinate system of the most recent image.

After the re-projection and transformations, it may be that not every pixel position has a corresponding depth value. At a step 1140, for each pixel position 1250 in the colour data (C) 1260, if a corresponding depth value exists in the transformed data output by the step 1130, then the colour information at that pixel position is associated with the transformed depth information 1270 associated with that pixel position and the results stored in the background buffer 985 at a step 1150. Processing then moved onto the next pixel position at a step 1160. If, on the other hand, a depth value did not exist in the transformed depth information at that pixel position, then pixel information (depth and colour) is reused from a previous frame (such as an immediately preceding frame) at a step 1170.

Note that variations of the step 1170 are possible. For example, in an instance in which no depth data is available at a pixel location, the image data from a corresponding pixel location in a previous frame can be used "as-is" (without further modification). However, there are several possible options to modify and in some instances improve the quality of this data further. For example, a blurred version of the previous image (or at least of those pixels or areas including those pixels which are relevant to the step 1170) could be generated, and the missing data substituted by pixel data from the blurred image. This means that the missing regions in the current image are filled in with "softer" data, or in other words by substitute pixel data which (by virtue of the blurring process) is less likely to exhibit a sharp transition from surrounding pixel data of the current image. This can improve the subjective appearance of the output current image significantly. An example of a blurring function which can be applied to the preceding image is a Gaussian blur. Such a blur is sometimes expressed as being defined by a parameter relating to a radius around each pixel. As an example a three pixel radius Gaussian blur function could be used in this operation. Note that the blurred version of an image is used (in these examples) only for the purposes of providing concealment or substitute pixels to another image.

Furthermore, in some examples the hole filling process (providing pixel data at the step 1170 where there is none) can be improved by using more samples, more frames and/or more filtering.

As a further option, if a 2D or 3D velocity buffer is present, the fetch position (in the previous image) for filling in holes (pixel positions in the current image for which pixel data needs to be substituted) can be offset by the inverse of the velocity vector. This can decrease image flicker. For example, in a racing game with trees on the side, in a basic example of the step 1170, these trees will leave a trail behind when the game is moving quickly as the previous frame contains tree data where the holes appear. By offsetting the fetch location with the inverse direction of the tree movement this unwanted trail effect can be reduced.

Accordingly, in these examples, the step of re-projecting comprises associating pixel data derived from the most recent image with the re-projected depth data. An example of pixel data derived from a previous image is the use of blurred pixel data from the previous image. For example, for any pixel position at which re-projected depth data does not exist, the depth data and pixel data derived from the most recent image may be used.

Figure 30:
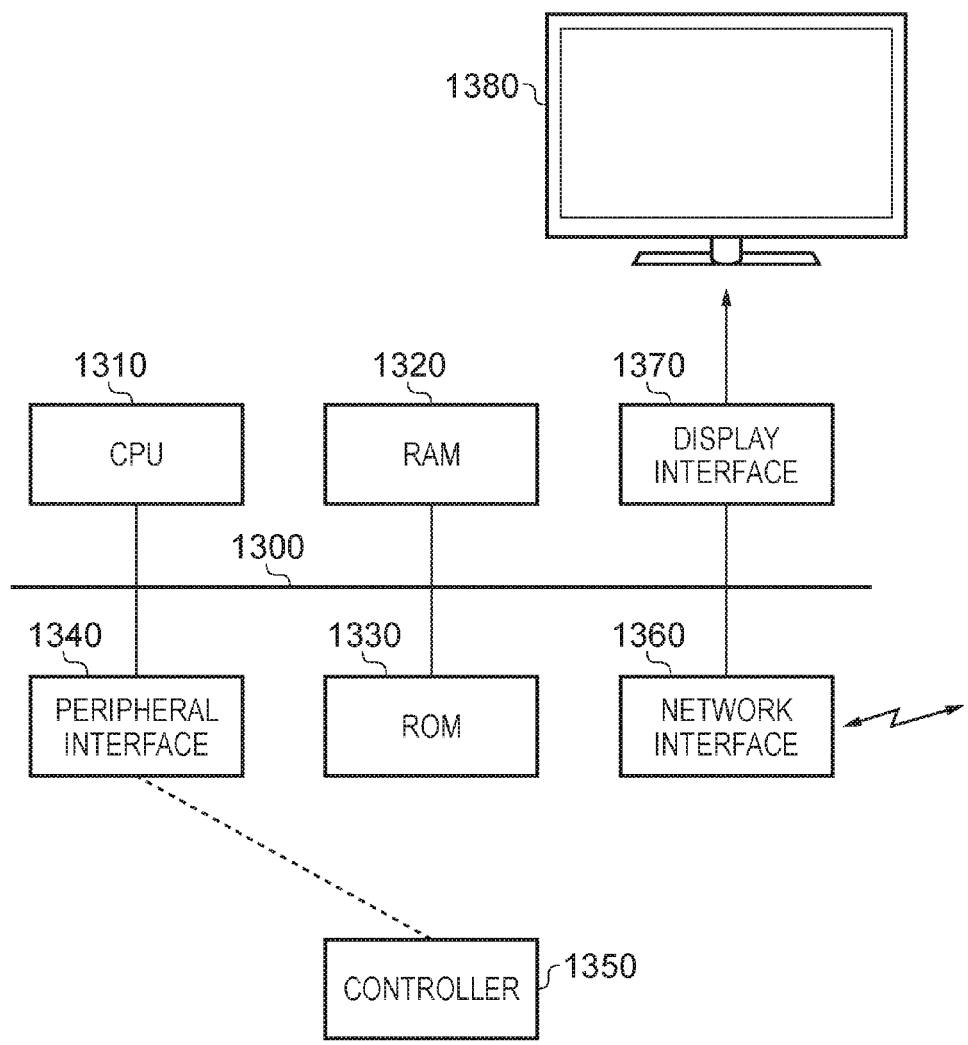
FIG. 30 schematically illustrates a data processing apparatus.

FIG. 30 schematically illustrates a data processing apparatus suitable for performing the processes discussed above. In the data processing apparatus, a bus connection 1300 links a central processing unit (CPU) 1310, a random access memory (RAM) 1320, a read only memory (ROM) or other non-volatile storage 1330, a peripheral interface 1340 connectable, for example by a wireless connection, to a user-operable controller 1350, a network interface 1360 connectable to a network such as the Internet, and a display interface 1370 connectable to a display device 1380. The render buffers as described above may form part of the RAM 1320. In operation, the CPU 1310 executes computer software stored in the RAM and/or the ROM to carry out the data-processing operations discussed above.

FIG. 30 therefore provides an example of a display system connectable to a display operable to display an image to a viewer, the display system comprising:

a detector configured to detecting an initial position and/or orientation of an image view;

an image renderer configured (i) to generate foreground portions of an image according to the detected initial position and/or orientation; and (ii) to generate background portions of the image at an image rendering rate according to the detected initial position and/or orientation;

an output image generator operable at an image display rate higher than the image rendering rate and configured to:

(i) detect a current position and/or orientation of the image view;

(ii) re-project the background portions of a most recent image according to any differences between the initial position and/or orientation and the current position and/or orientation of the image view; and (iii) combine the foreground portions and the re-projected background portions to generate an image for display.

Note that the display could be an HMD, for example.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

It will be appreciated that data signals generated by the variants of apparatus and methods discussed above, and storage or transmission media carrying such signals, are considered to represent embodiments of the present disclosure.

Where methods of processing are discussed above, it will be appreciated that apparatus configured to perform such methods are also considered to represent embodiments of the disclosure. It will also be appreciated that video storage, transmission, capture and/or display apparatus incorporating such techniques is considered to represent an embodiment of the present disclosure.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be apparent that numerous modifications and variations of the present disclosure are possible in light of the above teachings. It is therefore to be understood that within the scope of the appended claims, the technology may be practiced otherwise than as specifically described herein.

Respective embodiments are defined by the following numbered clauses:

1. A display method using a display operable to display an image to a viewer, the method comprising:
   detecting an initial position and/or orientation of an image view;
   rendering foreground portions of an image according to the detected initial position and/or orientation;
   rendering background portions of the image according to the detected initial position and/or orientation, at an image rendering rate;
   at an image display rate higher than the image rendering rate:
   (i) detecting a current position and/or orientation of the image view;
   (ii) re-projecting the background portions of a most recent image according to any differences between the initial position and/or orientation and the current position and/or orientation of the image view; and
   (iii) combining the foreground portions and the re-projected background portions to generate an image for display.
2. A method according to clause 1, in which the most recent image comprises a most recent image for display.
3. A method according to clause 1, in which the most recent image comprises a most recently rendered image.
4. A method according to any one of the preceding clauses, in which:
   the generating step comprises providing depth data indicating the image depth of one or more image features; and
   the step of re-projecting comprises re-projecting the depth data.
5. A method according to clause 4, in which the step of re-projecting comprises mapping the re-projected depth data to a coordinate system of the most recent image.
6. A method according to clause 5, in which the step of re-projecting comprises associating pixel data derived from the most recent image with the re-projected depth data.
7. A method according to clause 6 in which, for any pixel position at which re-projected depth data does not exist, the depth data and pixel data derived from the most recent image are used.
8. A method according to any one of the preceding clauses, in which the generating step comprises associating metadata with the generated image, the metadata indicating the initial position and/or orientation of the image view.
9. A method according to any one of the preceding clauses, in which the image view is an in-game camera view of a computer game.
10. A method according to clause 9, in which the display comprises a display screen.
11. A method according to any one of clauses 1 to 8, in which the display is a head-mountable display and the position and/or orientation of the viewer's head is detected as a position and/or orientation of an image view by detecting a position and/or orientation of the head-mountable display.
12. A method according to any one of the preceding clauses, in which the step of rendering foreground portions comprises rendering foreground portions of the image at the image rendering rate.
13. A method according to any one of clauses 1 to 11, in which the step of rendering foreground portions comprises rendering foreground portions of the image at the image display rate.
14. Computer software for carrying out a method according to any one of the preceding clauses.
15. A storage medium by which computer software according to clause 14 is stored.
16. A display system connectable to a display operable to display an image to a viewer, the display system comprising:
   a detector configured to detecting an initial position and/or orientation of an image view;
   an image renderer configured (i) to generate foreground portions of an image according to the detected initial position and/or orientation; and (ii) to generate background portions of the image at an image rendering rate according to the detected initial position and/or orientation;
   an output image generator operable at an image display rate higher than the image rendering rate and configured to:
   (i) detect a current position and/or orientation of the image view;
   (ii) re-project the background portions of a most recent image according to any differences between the initial position and/or orientation and the current position and/or orientation of the image view; and
   (iii) combine the foreground portions and the re-projected background portions to generate an image for display.
17. A head mountable display comprising a display system according to clause 16, and one or more display devices.

We claim:

1. A display method using a display operable to display an image to a viewer, the method comprising:
   detecting, by a detector device, at least one of an initial position and an initial orientation of an image view;

rendering, by an image renderer, foreground portions of an image according to the detected at least one of the initial position and the initial orientation;

rendering, by the image renderer, background portions of the image according to the detected at least one of the initial position and the initial orientation, at an image rendering rate;

at an image display rate higher than the image rendering rate:
(i) detecting, by an output image generator, at least one of a current position and a current orientation of the image view;
(ii) re-projecting, by the output image generator, background portions of a most recent image according to any differences between either the initial position and the current position, or between the initial orientation and the current orientation of the image view; and
(iii) combining, by the output image generator, the foreground portions and the re-projected background portions to generate an image for display;

in which:
rendering the background portions comprises providing depth data indicating an image depth of one or more image features;
re-projecting the background portions comprises re-projecting the depth data by mapping the re-projected depth data to a coordinate system of the most recent image and associating pixel data derived from the most recent image with the re-projected depth data; and
in which, for any pixel position at which re-projected depth data does not exist, the depth data and pixel data are derived from the most recent image are used.

2. A method according to claim 1, in which the most recent image comprises a most recent image for display.

3. A method according to claim 1, in which the most recent image comprises a most recently rendered image.

4. A method according to claim 1, further comprising associating metadata with the generated image, the metadata indicating at least one of the initial position and the initial orientation of the image view.

5. A method according to claim 1, in which the image view is an in-game camera view of a computer game.

6. A method according to claim 5, in which the display comprises a display screen.

7. A method according to claim 1, in which the display is a head-mountable display and at least one of a position and an orientation of the viewer's head is detected as at least one of a position and an orientation of a given image view by detecting at least one of a position and an orientation of the head-mountable display.

8. A method according to claim 1, in which rendering the foreground portions comprises rendering the foreground portions of the image at the image rendering rate.

9. A method according to claim 1, in which rendering the foreground portions comprises rendering the foreground portions of the image at the image display rate.

10. A non-transitory machine-readable storage medium which stores computer readable instruction thereon that, when executed by a computer, cause the computer to perform a display method using a display operable to display an image to a viewer, the method comprising:

detecting at least one of an initial position and an initial orientation of an image view;

rendering foreground portions of an image according to the detected at least one of the initial position and the initial orientation;

rendering background portions of the image according to the detected at least one of the initial position and the initial orientation, at an image rendering rate;

at an image display rate higher than the image rendering rate:
(i) detecting at least one of a current position and a current orientation of the image view;
(ii) re-projecting background portions of a most recent image according to any differences between either the initial position and the current position, or between the initial orientation and the current orientation of the image view; and
(iii) combining the foreground portions and the re-projected background portions to generate an image for display;

in which:
rendering the background portions comprises providing depth data indicating an image depth of one or more image features;
re-projecting the background portions comprises re-projecting the depth data by mapping the re-projected depth data to a coordinate system of the most recent image and associating pixel data derived from the most recent image with the re-projected depth data; and
in which, for any pixel position at which re-projected depth data does not exist, the depth data and pixel data are derived from the most recent image are used.

11. A display system connectable to a display operable to display an image to a viewer, the display system comprising:
a detector configured to detect at least one of an initial position and an initial orientation of an image view;
an image renderer configured (i) to generate foreground portions of an image according to at least one of the detected initial position and the detected initial orientation; and (ii) to generate background portions of the image at an image rendering rate according to at least one of the detected initial position and the detected initial orientation;
an output image generator operable at an image display rate higher than the image rendering rate and configured to:
(i) detect at least one of a current position and a current orientation of the image view;
(ii) re-project background portions of a most recent image according to any differences between either the initial position and the current position, or between the initial orientation and the current orientation of the image view; and
(iii) combine the foreground portions and the re-projected background portions to generate an image for display;

in which:
the image renderer is configured to provide depth data indicating an image depth of one or more image features;
the output image generator is configured to re-project the depth data by mapping the re-projected depth data to a coordinate system of the most recent image and associating pixel data derived from the most recent image with the re-projected depth data; and
in which, for any pixel position at which re-projected depth data does not exist, the depth data and pixel data are derived from the most recent image are used.

12. A head mountable display comprising a display system according to claim 11 and one or more display devices operatively coupled to the display system.

* * * * *